E. LINDNER.
Breech-Loading Fire-Arm.
No. 1,053. Reissued Oct. 2, 1860.
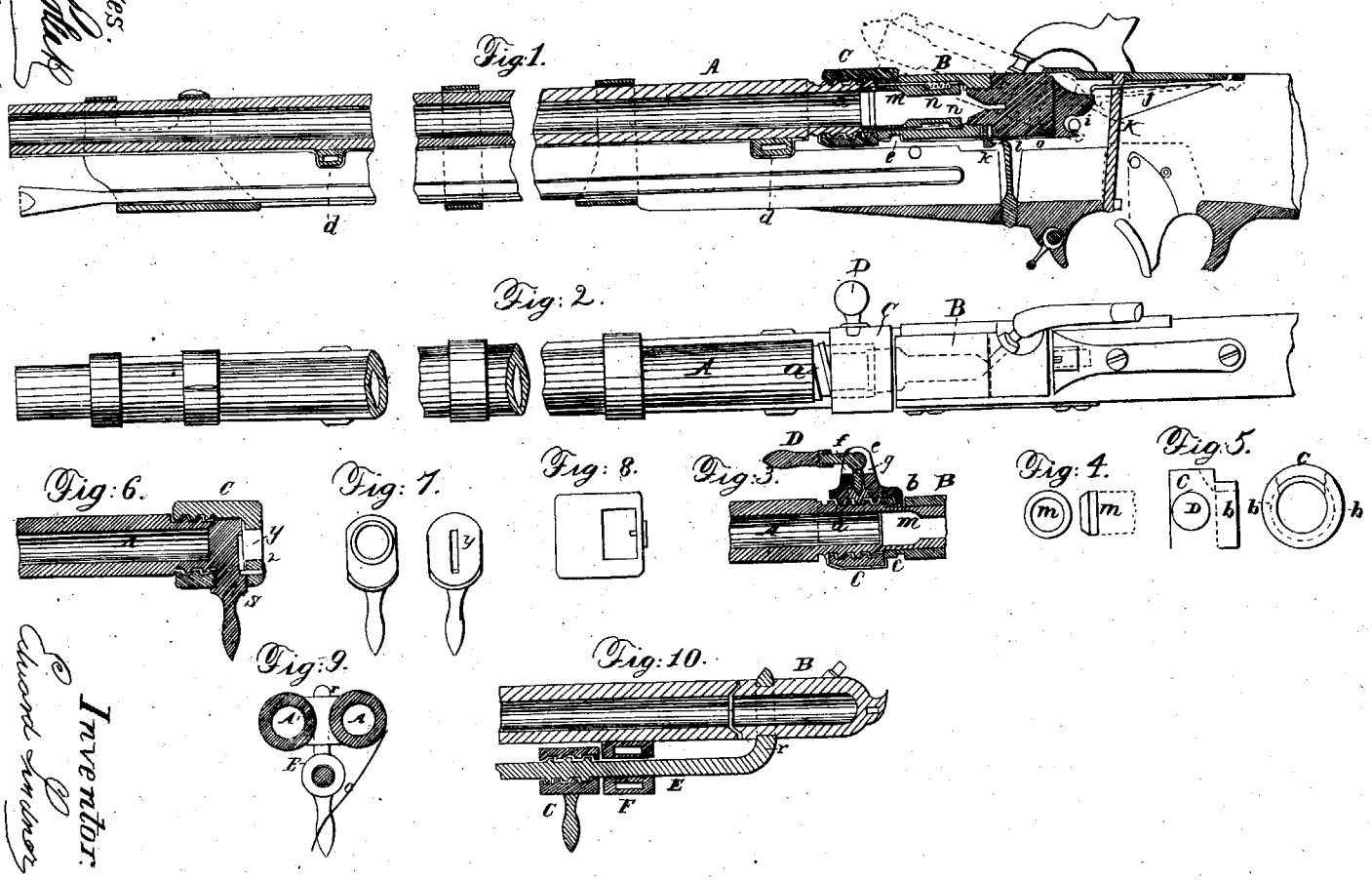
Witnesses.
A. Pollock
G. Dieterich
Inventor:
Edward Lindner
N. PETERS, PHOTO-LITHOGRAPHER, WASHINGTON, D. C.

UNITED STATES PATENT OFFICE.

EDWARD LINDNER, OF NEW YORK, N. Y.

IMPROVEMENT IN BREECH-LOADING FIRE-ARMS.

Specification forming part of Letters Patent No. 23,378, dated March 29, 1859; Reissue No. 1,053, dated October 2, 1860.

DIVISION A.

*To all whom it may concern:*

Be it known that I, EDWARD LINDNER, of New York, in the county and State of New York, have invented a new and useful Improvement in Fire-Arms; and I do hereby declare the following to be a full and exact description of the same, reference being had to the accompanying drawings, in which—

Figure 1 represents a broken sectional longitudinal elevation of a single-barreled gun or musket constructed according to my improvement; Fig. 2, a top view of the same, and Figs. 3, 4, and 5 views on detail of parts thereof. Fig. 6 represents a sectional elevation, in part, of my improvement as applied to a cannon or piece of heavy ordnance, and Figs. 7 and 8 views of details thereof. Figs. 9 and 10 represent in longitudinal and transverse section views of my improvement as modified to a double-barreled gun or fowling-piece.

My improvement has reference to fire-arms generally, including guns or muskets of one or more barrels for infantry or hand service, and cannons or other ordnance-arms of large and small caliber for artillery or field service. It belongs in its main character or feature to fire-arms of the breech-loading description, but admits, where such preference is given, of the gun being loaded by the muzzle or barrel without impediment by the provision which is afforded for loading it at the breech, and it possesses many advantages over ordinary breech-loading guns, including an easy conversion of the ordinary muzzle-loading musket into a breech-and-muzzle-loading one.

Referring to Figs. 1, 2, 3, 4, and 5 of the accompanying drawings, I cut on the rear end of the barrel A of a musket an external screw-thread, *a*, and connect said rear end of the barrel with the breech B by means of a screw-threaded sleeve, C, arranged to fit the screw-thread *a* on the end of the barrel and to grasp the breech by means of a projecting annular flange, *b*, fitting in a groove, *c*, of the breech.

The breech B may be formed by cutting a piece of the necessary length off of the rear end of the barrel, and afterward cutting the screw-thread and groove in the barrel and breech, as described, which especially may be the method of making the breech when it is desired to convert a muzzle-loading musket into a muzzle-and-breech-loading one.

The barrel may be connected with the stock by ears *d*, located by suitable wedges passing through the stock and ears.

The screw-sleeve *c* is provided with a lever, D, to assist in turning the sleeve. This lever may be made fixed or detachable at pleasure; but it is here shown jointed on a fulcrum-pin, *e*, to the sleeve, so that it may be shut down lengthwise with the barrel when not in use for turning the sleeve, and is formed with an eccentric or cam, *f*, arranged to act upon a locking-pin, *g*, so as, by turning down the lever, as described, after the breech has been drawn tight up to the barrel, it causes the locking-pin to be driven inward, to hold the sleeve from being accidentally turned.

The screw ferrule or sleeve C is provided with a projecting annular flange, *b*, arranged to fit a groove, *c*, made in or around the breech. This annular flange, as, also, if required, the sleeve at its rear end, is cut away at one part, as clearly shown in Fig. 5 of the drawings, to permit of the breech being raised, as shown by dotted lines in Fig. 5, when the turning of the screw-sleeve C has sufficiently disconnected the breech from the barrel; but in all other positions during the turning of the sleeve said flange serves to grasp the breech and to draw it toward or force it from the barrel. The breech at its rear end is formed with a tail, *h*, projecting in rear of the fulcrum pin or screw *i* of the breech. Upon this tail a spring, *j*, acts, to shoot up or lift the breech at its front end when released from grip.

The fulcrum-pin or axis *i* of the breech is a lock-screw that may be readily removed at pleasure. This fulcrum-pin fits through an oblong recess in the back tail end of the breech, and serves also to guide the breech in the longitudinal movement given the latter by the screw-sleeve. The breech C is also provided with a steel wedge or hook, *k*, arranged to gear and ungear with a hooked spring or catch, *l*. On shutting down the breech the hooked catch, *l*, locks on the hook *k* of the breech and holds the breech until the screw-sleeve is turned and made to urge forward the breech to establish the close joint with the barrel, when said hooks become disengaged. On reversing the action of the screw-sleeve to force the breech back, the hook *k* of the breech acts on the top of the hooked end of the spring *b* to force the latter back, so as not to interfere with the shooting upward of the breech when the latter is released from grip of the annular projecting flange of the screw-sleeve. The breech, which is generally made of the rear portion of the barrel of an ordinary musket to be converted into a breech-loading musket, is often too short to allow of the cone terminating its front edge to be turned. In such cases I provide the breech with an additional ring or box made of steel or hard metal. The front end of the ring or box slightly projects in advance of the breech, and is made beveled to correspond with a beveled formation to the rear of the barrel. This ring at the front end of the breech may be extended backward to form in one piece the interior box or lining to the breech, as here shown, or it may be made a separate piece in continuation of the breech. This interior lining or box, *m*, may either be made fast inside the breech or movable. If movable, it should be surrounded with an asbestus or other soft packing, *n*, not liable to corrosion or injury from the gas or heat produced in firing, to prevent the escape of gas round or past the box, and said box should be made somewhat shorter than the bore of the breech, so that the explosion of the gas in firing will serve to urge its beveled forward end tight against the barrel. The closing of the breech, after another charge has been inserted, will serve each time to bring back this box to be again urged forward by the explosion of the powder. The breech is so arranged that, when loading, a part of the ball is allowed to project beyond the breech in front, so that when closing the breech the ball is brought centrally within the barrel and held fast there, when the screw-sleeve C is turned to urge up the breech as far as the latter is permitted to go. Thus the ball is forced up in a straight central direction within the barrel before firing, whereby accuracy in the fire is attained and the joint separating the breech and barrel preserved from injury. The breech is provided at its sides, or at any other suitable part, with a guiding stop-slot, *o*, in which a screw-pin is arranged to project to restrict the proper elevation of the breech. By taking said stop-screw out the breech can be lifted out for the purpose of cleaning the latter.

Inside of the cock, and connected with it, may be arranged an iron projection to fit, when firing, the opening between the breech and the stock in the rear when the breech is forced home against the barrel, to prevent accidental or premature explosion of the cap, and serving to support the breech in the rear against the shock produced by the explosion.

A fire-arm constructed according to the foregoing description is simple, and can be managed under all circumstances with great facility, will be found safe, and not liable to more than ordinary deterioration. For a double-barreled gun or fowling-piece (see Figs. 9 and 10) the screw-sleeve C should be arranged to fit a screw-thread on a rod, E, sliding through the ear *f*, which is firmly connected to the barrels and which is furnished with an arm, *r*, that fits into a notch or groove in the metal between the breeches B or of either side of the barrels A, and serves, on turning to the right or to the left the screw-sleeve, to force forward or back the breeches up or from the rear ends of the barrels, substantially as in the case of the single-barreled gun or musket.

Having thus described my improvements in fire-arms, what I claim as new, and desire to secure by Letters Patent, is—

1. The method herein described for operating or closing the breech and forming a tight joint at the junction of the barrel with the breech by the employment of a screw ferrule or sleeve fitting an outer screw-thread on the barrel, and provided with a projecting annular flange for grasping and releasing the breech, and for drawing the same backward and forward in the direction of the barrel to or from the rear end thereof upon said screw-threaded sleeve, being operated substantially as herein described.

2. In combination with a movable box within the breech, constructed and operating as described, the packing thereof by means of asbestus or its equivalent, substantially in the manner and for the purposes described.

3. Locking the screw-threaded sleeve that operates the breech by forming the pivoted lever which serves to turn said sleeve, with an eccentric or cam arranged to act upon a locking-pin by pressing down said lever after the breech is drawn tight, as herein set forth.

In testimony whereof I have signed my name to this specification before two subscribing witnesses.

EDWARD LINDNER.

Witnesses:
A. POLLAK,
W. FAIRFAX.